United States Patent Office 3,440,752
Patented Apr. 29, 1969

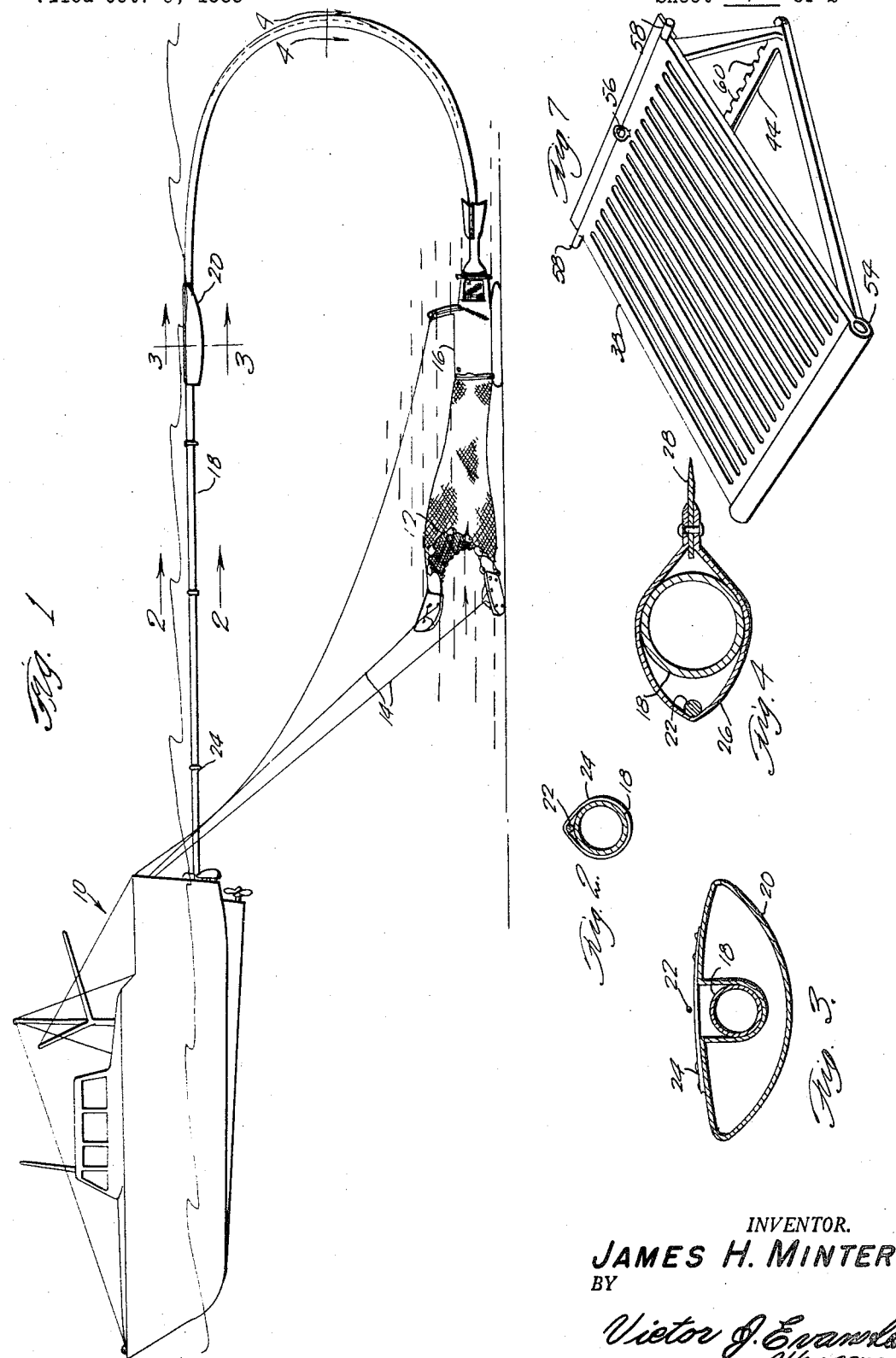

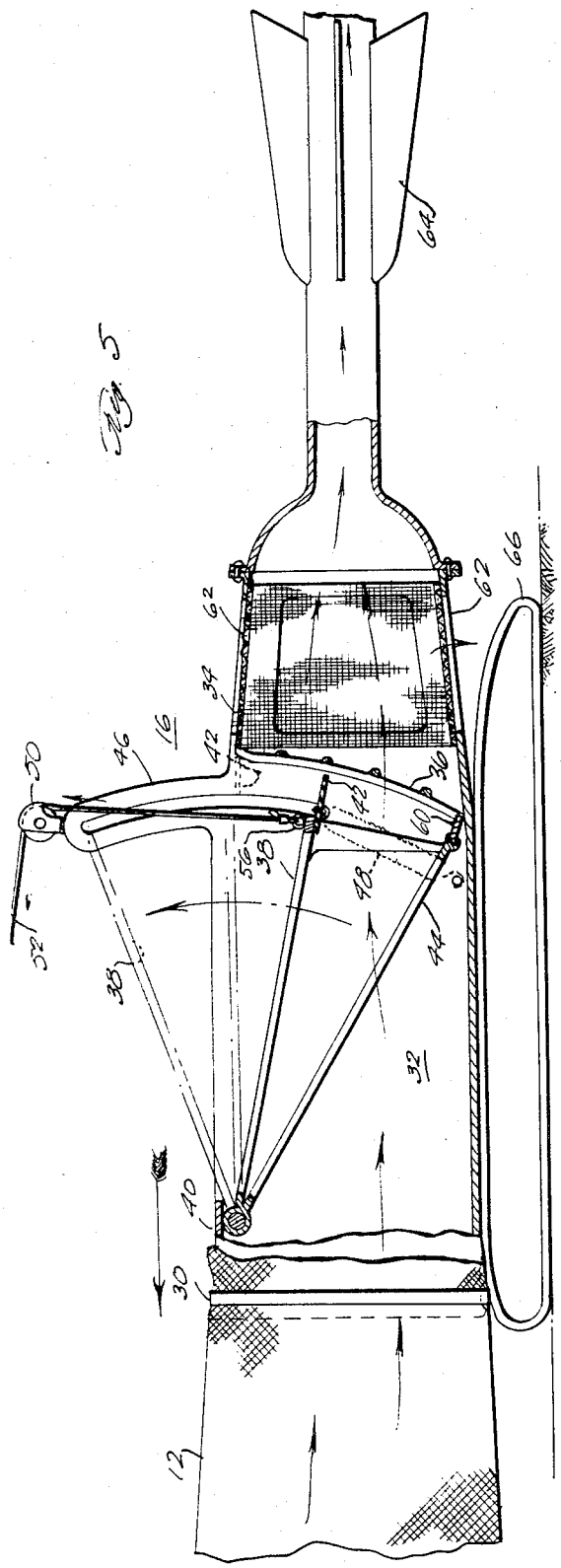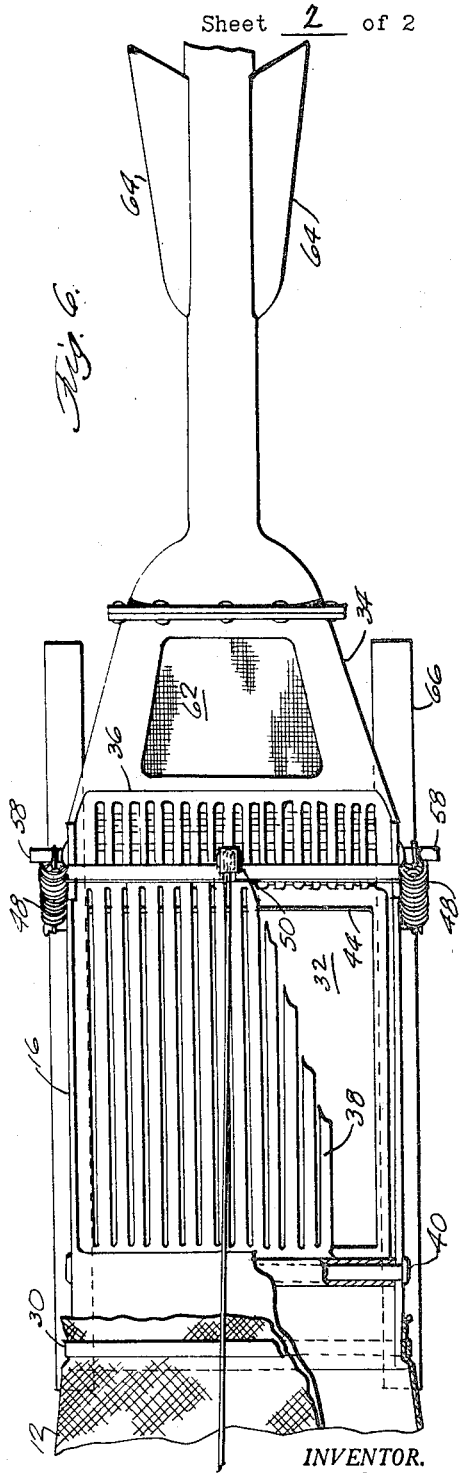

3,440,752
TRAWL NET SYSTEM
James H. Minter, P.O. Box 84,
Ormond Beach, Fla. 32074
Filed Oct. 6, 1966, Ser. No. 589,173
Int. Cl. A01k 73/02, 79/00
U.S. Cl. 43—6.5       10 Claims

ABSTRACT OF THE DISCLOSURE

A trawl net system for continuously gathering sea life for use with a boat, in which there is a trawl net having a junction box located at the trailing end thereof, a pumping tube connected between the junction box and the boat for conveying sea life to the boat, and pump means for facilitating the conveyance of the sea life. Also the junction box is provided with a grill for allowing only certain sizes of sea life to pass therethrough to the pumping tube. Undesired sea life escape through a resilient gate or are ejected from the junction box by a wiper engaging the grill. Control of the apparatus is from the boat by remote control.

---

This invention relates generally to apparatus employed in trawl net fishing and more particularly to an improved trawl net system for providing continuous gathering of sea life.

Present-day trawl net fishing is accomplished from a boat which tows a large net through the sea where shrimp and the seafood products are found. These areas are usually found near the sea bottom and structure is provided for maintaining the nets at such depths. The nets employed in such fishing activities are of various designs and configurations, but are usually substantially conical in shape with a narrowed portion at their trailing end which is called a "bag" or "cod." In the present fishing operations, the net is lowered into the water, towed behind the boat near the seabottom, and raised to the boat when a catch is made by a power cable and associated assemblies. After the net has been towed through the water and has gathered a sufficient amount of sea life, it is raised to the level of the boat and the sea life is emptied into the boat from the "bag." When the net is once again in the water, workmen separate the desired sea life and discard the undesired back into the sea. This practice, however, has many disadvantages which are overcome by the present invention.

A primary consideration to the fisherman is, of course, to increase the yield of each fishing trip. In the prior operations, however, this yield was not a maximum, since the net had to be raised periodically and the sea life removed therefrom. Also before the first catch of each trip during the time the net is in the water, the workmen have little or nothing to do waiting for the net to be raised. Furthermore, the yield resulting from the prior operations included a large amount of undesired sea life which had to be discarded. Such a practice, of course, required additional workmen to sort the desired from the undesired sea life. This practice also resulted in the killing of large numbers of sea life which suffocated or were otherwise harmed when packed into the net during the catch.

It is, therefore, a primary object of this invention to provide a trawl net system which will increase the desired fishing yield and decrease overhead costs to the fisherman.

It is another object of this invention to provide a trawl net system which will eliminate a great majority of the undesired sea life from the catch before it is delivered to the boat.

Another object of the present invention is to provide a trawl net system which will provide continuous gathering of sea life.

These and other objects will be more fully realized from the novel structure of the present invention which includes in combination with a boat, a trawl net having a junction box located at the trailing end thereof, a pumping tube connected between the junction box and the boat for conveying sea life to the boat, and a pump for facilitating the conveyance of the sea life. The junction box includes novel structure for providing the desired unique functions of the system. A grill is positioned within the junction box for allowing only certain sizes of sea life to pass therethrough to the pumping tube. Means for allowing most of the undesired sea life to escape from the junction box and a wiper for the grill are included to promote the desired function of the system. Control of the apparatus is from the boat and the necessary reeling cable is included in a novel combination with the tube to facilitate the passage of the apparatus through the water.

The invention, however, will be more fully realized and understood from the following detailed description when taken in conjunction with the accompanying drawings wherein like reference numerals throughout the various views designate the same element or structure and wherein:

FIGURE 1 is a view of the entire novel system of the present invention as it appears in operation in the sea and gathering sea life;

FIGURE 2 is a sectional view taken along lines 2—2 of FIGURE 1;

FIGURE 3 is a sectional view taken along lines 3—3 of FIGURE 1 and illustrating a float structure for the pumping tube;

FIGURE 4 is a sectional view taken along lines 4—4 of FIGURE 1 illustrating the novel structure for the tube assembly;

FIGURE 5 is a side view of the novel junction box employed in the exemplification shown and illustrating in partial section the internal configuration thereof;

FIGURE 6 is a top view of the junction box shown in FIGURE 5 having some elements shown in broken section to illustrate further the internal configuration thereof; and FIGURE 7 is a detailed view of the baffle and wiper structure employed in the exemplification shown.

With reference to FIGURE 1, there is shown the system of the present invention as it appears in a typical operation. A boat 10 includes the required cable reeling assembly and sea life sorting and storing equipment necessary for any trawl net fishing operation. A trawl net 12 is towed through the water along the sea bottom by cables 14 and includes the necessary structure for maintaining the opening therein in an open position during the towing. In the place of the "bag" or "cod" at the trailing end of net 12, a junction box 16 is located for receiving the sea life funneled therein by the net. That sea life which is allowed to pass through the junction box is carried through a tube 18 to the boat. The sorting function accomplished by the junction box will be more fully understood from the detailed description of FIGURES 5-7. A pump (not shown) within the boat provides for the transmittal of water and sea life through the tube and onto the sorting structures on the deck of the boat. To insure against kinking and bending of the tube, a float 20 is provided at a preselected location along the tube. Furthermore, to relieve tension on tube 18 and to provide assistance in the reeling of the net, a cable and sleeve assembly are provided along the length of the tube. This assembly is better illustrated in the sectional views of FIGURES 2-4.

As shown in FIGURE 2, a cable 22 is held to tube 18 by a band 24. This section of cable 22 extends from the boat to float 20 and is anchored at both ends thereto respectively. FIGURE 3 illustrates the tube and cable arrangement associated with float 20. Tube 18 is disposed within a recess of float 20 to provide stabilization thereof in the water and to prevent the float from turning over which would cause twisting of the tube. A plate 24 is bolted or otherwise secured to float 20 over tube 18 to prevent separation therebetween. Tube 18 may be free to slide in float 20 or it may be fastened therein, as desired.

The structure illustrated in FIGURE 4 is that portion of the tube and sleeve assembly between the float and junction box. A sleeve 26, continuous from the float to adjacent the junction box, encircles cable 22 and tube 18 and may terminate by being secured to the tube near fins 64. A vane 28 is provided in the sleeve opposite the cable 22 for further providing stabilization to the assembly as it is pulled through the water. The vane, as desired, may be continuous along the entire length of sleeve 26 or it may be provided only in a mid section thereof when stability is required in its travel through the water. Sleeve 26 is formed to provide a streamlined configuration to the flow of water. Cable 22 assists in maintaining that configuration by virtue of its location within the sleeve as shown in FIGURE 4. This unique structure, therefore, not only provides a streamlined effect to the assembly, but provides stabilization to the flow of water thereover.

FIGURE 5 illustrates the novel structure of the junction box wherein net 12 is secured by a band 30 or other suitable means to junction box 16. The junction box is composed of two sections: a sorting chamber 32 and a collecting chamber 34. A grill 36 separates the two chambers and functions to allow the passage of smaller sea life from the sorting chamber to the collecting chamber.

A baffle 38 is pivotally secured by a pin 40 to the junction box and forms an opening top wall for the sorting chamber. A resilient flap 42 is secured to the free end of baffle 38 adjacent grill 36 for allowing the escape of some undesired sea life. A wiper 44 is secured in spaced relationship from the free end of the baffle and is disposed for pivotal movement therewith for wiping the grill. The baffle and wiper are slideably mounted in a pair of tracks 46 at their free ends and are biased to a closed or down position by springs 48. Secured to the top of tracks 46 is a pulley 50 for receiving a control cable 52 which moves the baffle and wiper against the biasing force of springs 48. The baffle may be moved against the bias of springs 48 to an opened position as shown by the dotted lines by the struggling force of large sea life thereby allowing their escape. Also flap 42 may allow the escape of medium size sea life by bending upward as shown by its position in dotted lines of FIGURE 5.

The baffle and wiper structure is better illustrated in FIGURE 7 wherein a sleeve 54 is disposed for receiving pin 40 for pivotally securing the structure to the junction box. A ring 56 receives cable 52 for providing control from the boat and extensions 58 are received for slidable movement in tracks 46 and receive one end of springs 48 for biasing in downward direction within the tracks. Wiper 46 is provided with a plurality of teeth 60 which are disposed for intermeshing engagement with grill 36. This engagement provides a cutting and wiping action to eliminate anything which might clog grill 36 when wiper 44 is rotated about pin 40. Grill 36 is arcuately shaped to provide continuous engagement with wiper 44 and teeth 60. This shape further allows the larger sea life which will not pass through the grill to be moved upward therealong by the force of water and to escape through an opening provided by the bending of flap 42 or the rotation of baffle 38 to an opened position.

Collecting chamber 34 receives all the sea life which passes through grill 36. The sides of the collecting chamber each contain a screen 62 for allowing water to pass therethrough so as to decrease the resistance of the structure while traveling through the water. Tube 18 is secured by any suitable means to chamber 34 for receiving the sea life therefrom. Fins 64 are provided on the tube near the junction to chamber 34 for increasing the stability of the apparatus in the water. A pair of runners 66 are also shown secured to a bottom wall of the junction box for sliding along the sea bottom and maintaining the apparatus in spaced relationship thereto.

The operation of the entire structure is as follows: Net 12 having junction box 16 and tube 18 connected thereto as shown is lowered into the water by cables 14 and 22. The position of float 20 on tube 18 is determined by the depth of the net in the water. When the apparatus has been let out, the towing operation begins. Sea life enters the forward opening of net 12 and is carried to the trailing end thereof and into chamber 32. The small sea life and water carried therein passes through grill 36 to chamber 34. Larger sea life is held by grill 36 and may slide to the top thereof by the force of the water passing therethrough. Flap 42 allows some of this trapped sea life to escape. When sea life is trapped in chamber 32 which is too large to escape past flap 42, baffle 38 may be raised by cable 52 to allow the escape. The large sea life may raise baffle 38 through the efforts of their struggle to escape confinement within chamber 32. Also, if the grill becomes clogged with anything causing the stoppage of sea life therethrough, cable 52 is pulled to move wiper 44 upward thereby removing the interfering substances. That sea life which has passed into chamber 34 is then pumped through tube 18 to the boat.

Since a large majority of undesired sea life is eliminated by the function of the junction box, less sorting is required on board the boat. Prior operations produced a maximum of 25% of the yield being desirable and the remaining portion had to be discarded. With the structure of the present invention this percentage can be increased considerably. Furthermore, the sea life is continuously being deposited upon the sorting tables on the boat thereby eliminating the need for hauling the "cod" of the net over the side of the boat and emptying it before the sorting can begin. The sorting operation can begin as soon as the apparatus is being towed through the water. These two distinct advantages save on manpower and on manhours, thus reducing the costs to the fisherman. Furthermore, the catch is continuous thereby increasing the yield for the same amount of fishing time.

The principles of the invention explained in connection with the specific exemplification thereon will suggest many other applications and modifications of the same.

What is claimed is:

1. In a trawl net system including a boat, the combination therewith comprising a trawl net having a forward opened end for receiving sea life, a junction box secured to a trailing end of said net and disposed for receiving sea life therefrom, a tube secured between said junction box and the boat, said junction box having a grill means allowing a selective portion of the sea life to pass to said tube and means engaging said grill means for discarding the remaining portion of the sea life received therein.

2. The system of claim 1 including a baffle forming an upper wall of said junction box and having one end pivotally secured thereto, the other end of said baffle being biased to a closed position adjacent said grill means for blocking access in the top of the box.

3. The system of claim 2 including a wiper secured to said baffle and disposed for pivotal movement therewith, said wiper including said means for engaging said grill means.

4. The system of claim 3 wherein said means for engaging said grill means includes a plurality of teeth disposed in intermeshing engagement with said grill means.

5. In a trawl net system including a boat, the combination therewith comprising a trawl net having a forward opened end for receiving sea life, a junction box secured to a trailing end of said net, a tube connected between said junction box and the boat, said junction box having a grill means disposed for passing desired sea life to said tube and means for ejecting undesired sea life therefrom, a cable connected between the boat and said junction box, a sleeve enclosing said tube and said cable and having a shape disposed for reducing resistance to the flow of water therearound.

6. The system of claim 5 including a vane secured to said sleeve for providing stabilization to said tube with respect to the flow of water.

7. The system of claim 6 including a float disposed for receiving a portion of said tube at a predetermined location in the length thereof.

8. In a trawl net system including a boat, the combination therewith comprising a trawl net having a forward end opened for receiving sea life, a junction box secured to a trailing end of said net and including a sorting chamber and a collecting chamber, a grill disposed between said sorting chamber and said collecting chamber, a baffle pivotally secured at one end to said junction box and forming a top wall of said sorting chamber and having the other end biased in an adjacent position to said grill, said baffle disposed for rotational movement to an opened position wherein the other end thereof is spaced a substantial distance from said grill, a wiper secured to said baffle and disposed for pivotal movement therewith and engagement with said grill, said grill being arcuately shaped to provide engagement of said wiper therewith during movement of said wiper from the biased position to the opened position of said baffle, a tube assembly connected between said collecting chamber and the boat, and means connected with said tube assembly for pumping water and sea life from said collecting chamber to the boat.

9. The system of claim 8 wherein said tube assembly includes a tube disposed for conveying the water and sea life, a cable connected between the boat and said junction box, a sleeve enclosing a portion of said tube and said cable and including a vane, and a float secured to said tube at a predetermined location in the length thereof.

10. The system of claim 8 including spring means for providing a bias to said baffle, a pair of tracks disposed for receiving said baffle for slidable movement, and means for actuating said baffle to the opened position.

References Cited

UNITED STATES PATENTS

| | | | |
|---|---|---|---|
| 1,447,553 | 3/1923 | Hudson | 43—6.5 |
| 1,462,196 | 7/1923 | Dros | 43—6.5 |
| 1,745,251 | 1/1930 | Enright | 43—6.5 |
| 2,721,411 | 10/1955 | Pedersen | 43—9 |
| 2,890,543 | 6/1959 | Mitchell | 43—9 |

FOREIGN PATENTS

| | | |
|---|---|---|
| 1,442,545 | 5/1966 | France. |
| 153,809 | 10/1963 | U.S.S.R. |

WARNER H. CAMP, *Primary Examiner.*

U.S. Cl. X.R.

43—9